United States Patent
Bosma et al.

(10) Patent No.: US 6,928,622 B2
(45) Date of Patent: *Aug. 9, 2005

(54) PERSISTENT STATEFUL AD HOC CHECKBOX SELECTION

(75) Inventors: John Hans Handy Bosma, Cedar Park, TX (US); Keith Raymond Walker, Austin, TX (US); Yen-Fu Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 604 days.

This patent is subject to a terminal disclaimer.

(21) Appl. No.: 10/042,490

(22) Filed: Jan. 9, 2002

(65) Prior Publication Data

US 2003/0128226 A1 Jul. 10, 2003

(51) Int. Cl.⁷ .................................................. G09G 5/00
(52) U.S. Cl. ...................... 715/769; 715/860; 715/770; 715/812; 715/764; 715/810; 715/821; 715/824
(58) Field of Search ................................. 715/769, 770, 715/812, 859–860, 764, 810, 821–824; 345/769, 770, 812, 859

(56) References Cited

U.S. PATENT DOCUMENTS

| | | | |
|---|---|---|---|
| 5,959,627 A | 9/1999 | Duwaer et al. | 345/345 |
| 6,104,398 A | 8/2000 | Cox, Jr. et al. | 352/352 |
| 6,252,592 B1 | 6/2001 | King et al. | 345/339 |
| 6,473,071 B2 * | 10/2002 | Liu | 345/168 |

* cited by examiner

*Primary Examiner*—Kristine Kincaid
*Assistant Examiner*—Ryan Pitaro
(74) *Attorney, Agent, or Firm*—John R. Biggers; David A. Mims, Jr.; Biggers & Ohanian, LLP

(57) ABSTRACT

A method for stateful toggling of checkbox status, including detecting a touch event on a first checkbox, storing the initial status of all checkboxes in the set, and toggling the status of the first checkbox to a new status. Embodiments also include repeatedly, for a multiplicity of repetitions, carrying out the steps of detecting a drag event for a checkbox onto which a user drags the pointer, comparing the initial status of the checkbox onto which a user drags the pointer and the new status of the first checkbox, and if the stored initial status of a checkbox for which a drag event is detected is the same as the new status of the first checkbox, toggling the status of the checkbox for which a drag event is detected.

27 Claims, 4 Drawing Sheets

PERSISTENT STATEFUL AD HOC CHECKBOX SELECTION

BACKGROUND OF THE INVENTION

1. Field of the Invention

The field of the invention is data processing, or, more specifically, methods, systems, and products for stateful ad hoc checkbox selection in graphical user interfaces.

2. Description of Related Art

The role of checkboxes in user interface design is problematic for users making ad hoc selections of computer data. The typical use of checkboxes is to allow users to select multiple items in a list. Prior to this invention, users generally selected multiple data items using checkboxes in one of several ways, including, for example: 'select all,' 'clear all,' 'toggle all,' 'click individual items,' and 'select all in a group.'

While each of these methods allows selection of multiple data items, each is problematic. Viewed from an efficiency perspective, selection is especially problematic in cases where users make ad hoc choices from a checkbox list. Consider the hypothetical example of a 100-item list, in which the user desires to select 57 of the items. The hypothetical list can be described as "ad hoc" in that no preexisting logical grouping is sufficient to allow selection of items with a single user action. To select the 57 items, a user could 'select all,' then clear 43 individual items by clicking each, resulting in a total of 44 clicks to select the 57 items. Or the user could select 43 items the user does not want, then 'toggle all,' thus selecting the preferred items, again with a total of 44 clicks. Alternatively, the user could click 57 items by single-clicking each item desired. If there is a 'select all in groups' available in the user's GUI, then the number of clicks is dependent on a predefined logical system. In any event, the user would not be able to select 57 ad hoc items with a single click-and-drag operation.

Ad hoc selection is important because users have their own reasons for selecting data in a list; their preferences cannot always be predicted. Moreover, in most cases user preferences in selecting should not be limited to predefined logical groupings. Any system that limits the user to preset groupings undermines the goal of allowing maximal user flexibility, which is the point of checkbox lists in the first place. While each of the above methods in combination allows for ad hoc selection, each is unable to provide an efficient means of selecting data in an ad hoc fashion.

The 'select all' option includes too many items when the user seeks to make ad hoc selections. Obviously, the 'clear all' option selects too few, since no selection is made. The 'toggle all' requires a number of individual clicks and is dependent on preexisting selections. Likewise, the 'click individual items' option requires individual clicks for each item.

The 'select all in group' option has its own inefficiencies. First, 'select all in group' requires development effort to determine preexisting groups of checkbox items.

Second, regardless of how well the groups are formulated, ad hoc selection still requires single clicking after a group is selected. That is, the 'select all in group' option provides access to structured means for selection of data, which is the opposite of ad hoc selection. While the 'select all in group' option could shorten the number of clicks to make a particular set of ad hoc selections, that is not its purpose. Moreover, selecting by group can in some cases actually increase the number of clicks required to choose ad hoc items, depending on how closely the groups mirror the choices intended by the user.

Some attempts have been made to deal with these efficiency problems. For example, the invention described in IBM's U.S. Pat. No. 6,104,398, "Fast and efficient means for grouped object selection and deselection," attempts to overcome inefficiencies in item lists requiring users to select or deselect individual items. The '398 patent proposed a means for aggregating checkbox and other data items into predetermined groups so that a single operation could select multiple items. While this was a useful step forward, the method of the '398 patent required such groupings to be determined on a predefined basis. The problem of ad hoc selection of both contiguous and non-contiguous data in a list remained to be solved. Moreover, the method of the '398 patent required the instantiation of new controls external to the checkbox list itself, or in the alternative that some checkboxes control others, thus expanding the number of items in a list. A method that constrained selection controls to the minimum necessary to complete the task was still needed.

The minimum number of selection controls needed to complete an ad hoc selection is equal to the number of items in a list. In other words, there is no need to instantiate controls external to a list if the list is to be chosen in an ad hoc fashion. Fundamentally, the problem with checkbox selection prior to this invention was in dealing with ad hoc selection of data. That is, in any list of computerized data relying on checkboxes, users may need to select both contiguous and non-contiguous data. To select on an ad hoc basis means either checking individual items or relying on groups structured in an a priori fashion. A system that addresses these problems should allow users to select among items with the minimum number of operations necessary. For the purpose of a checkbox list, that minimum number of operations to select one or more items on an ad hoc basis is a single click-and-drag operation. Prior to this invention, no method has existed to allow for ad hoc selection of checkbox items with a single click-and-drag operation.

In fact, structured groupings substitute a priori judgments made by those who define the structure for judgments made by users, potentially imposing new inefficiencies. Selecting a structured group may require de-selection by the user. Ad hoc selection, then, does not imply a lack of structure in selections, although such may be the case, but instead that users impose their own structure on information. The user's definition of the user's intended list structure is generally by definition more efficient than judgments external to the user. It is effectively an unreliable accident if a predefined grouping aids ad hoc selection.

The present invention is a significant departure from previous approaches. For example, the "Official Guidelines for User Interface Developers and Designers" issued by Microsoft (Redmond, Wash.: Microsoft, 1999) specifies that checkbox controls are selected on an individual basis:

"When the user clicks a checkbox with the primary mouse button, either in the checkbox or on its label, the checkbox is selected and its state is toggled. When the user presses the mouse button, the input focus moves to the control and the checkbox displays its pressed appearance. Like option buttons and other controls, if the user moves the pointer off the checkbox or its label while pressing the mouse button, the control's appearance returns to its original state and retains the input focus. The state of the checkbox does not change until the mouse button is released. To change a control's setting, the pointer must be over the checkbox or its label when the user releases the mouse button."

In summary, this means that for checkbox controls relying on mouseclicks, checkbox selection occurs on an individual basis. The user must click on each item s/he wishes to select; the state of selections is not transferred from one checkbox to another. If the mouse moves off the checkbox, the checkbox reverts to its original state and the user cannot continue to select by hovering over other checkbox items. The limitations of prior approaches, then, are traceable to their reliance on mouseclicks as such.

SUMMARY OF THE INVENTION

Exemplary embodiments of the invention include methods for stateful toggling of checkbox status, implemented as a software program installed and operating on a computer comprising a computer processor coupled to computer memory, and a computer display which itself further comprises a graphical user interface ("GUI"). Exemplary embodiments typically include methods implemented on the GUI. In typical embodiments, the GUI is operated by a user using a pointing device, the pointing device having a capability of indicating a touch on a checkbox, and the pointing device having associated with it through the GUI a pointer displayed upon the GUI and responsive to physical motion of the pointing device. In some embodiments, the GUI having displayed upon it a set of checkboxes typically includes a multiplicity of checkboxes, in which each checkbox has a status comprising an indication whether a checkbox is selected.

Exemplary embodiments of the invention typically include detecting a touch event on a first checkbox, storing the initial status of all checkboxes in the set, and toggling the status of the first checkbox to a new status. Exemplary embodiments include repeatedly, for a multiplicity of repetitions, carrying out the steps of detecting a drag event for a checkbox onto which a user drags the pointer, comparing the initial status of the checkbox onto which a user drags the pointer and the new status of the first checkbox, toggling the status of the checkbox for which a drag event is detected, and if the stored initial status of a checkbox for which a drag event is detected is the same as the new status of the first checkbox.

In exemplary embodiments, for at least a portion of the repetitions, one or more checkboxes are typically positioned upon the display screen in the GUI between two of the additional checkboxes, in which a path along which the pointer drags between the two additional checkboxes lies outside the further checkboxes, whereby the statuses of the further checkboxes remain unaffected. In some embodiments, detecting a touch event typically includes changing a pointer device status to 'active' while a pointer for the device is positioned on the checkbox. In typical embodiments, the pointing device is a mouse. In some embodiments, the pointing device is a stylus pressed upon a touch sensitive pad. In other embodiments, the pointing device is a finger pressed upon a touch sensitive screen. In exemplary embodiments, the first checkbox has a GUI image and toggling the status of the first checkbox typically includes changing the GUI image of the first checkbox to indicate a change in the status of the first checkbox.

Exemplary embodiments of the invention typically include methods of stateful toggling of checkbox status, implemented as a software program installed and operating on a computer comprising a computer processor coupled to computer memory and a computer display which itself further comprises a graphical user interface ("GUI"). Exemplary embodiments typically include methods implemented on the GUI, the GUI operated by a user using a mouse, the mouse including a mouse button, the mouse having associated with it through the GUI a mouse pointer displayed upon the GUI and responsive to physical motion of the mouse. Typical embodiments include the GUI having displayed upon it a set of checkboxes including a multiplicity of checkboxes, wherein each checkbox has a status comprising an indication whether a checkbox is selected.

Exemplary embodiments of the invention typically include the user positioning the mouse pointer on a first checkbox, the user depressing the mouse button, wherein results a mouse down event, and detecting the mouse down event on the first checkbox. Exemplary embodiments typically include storing the initial status of all checkboxes in the set, and toggling the status of the first checkbox to a new status. Typical embodiments include the mouse, at the behest of the user, dragging the mouse pointer along a path on the display screen from the first checkbox to a second checkbox, detecting a mouse drag event on the second checkbox, comparing the initial status of the second checkbox and the new status of the first checkbox, and toggling the status of the second checkbox, if the stored initial status of the second checkbox is the same as the new status of the first checkbox.

In exemplary embodiments of the invention, a third checkbox is positioned upon the display screen in the GUI at a position between the first checkbox and the second checkbox, in which the path along which the mouse pointer is dragged from the first checkbox to the second checkbox lies entirely outside the third checkbox, whereby the steps of moving the mouse pointer to the second checkbox, detecting the mouse drag event, comparing the initial status of the second checkbox and the new status of the first checkbox, and toggling the status of the second checkbox leave the third checkbox unaffected.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
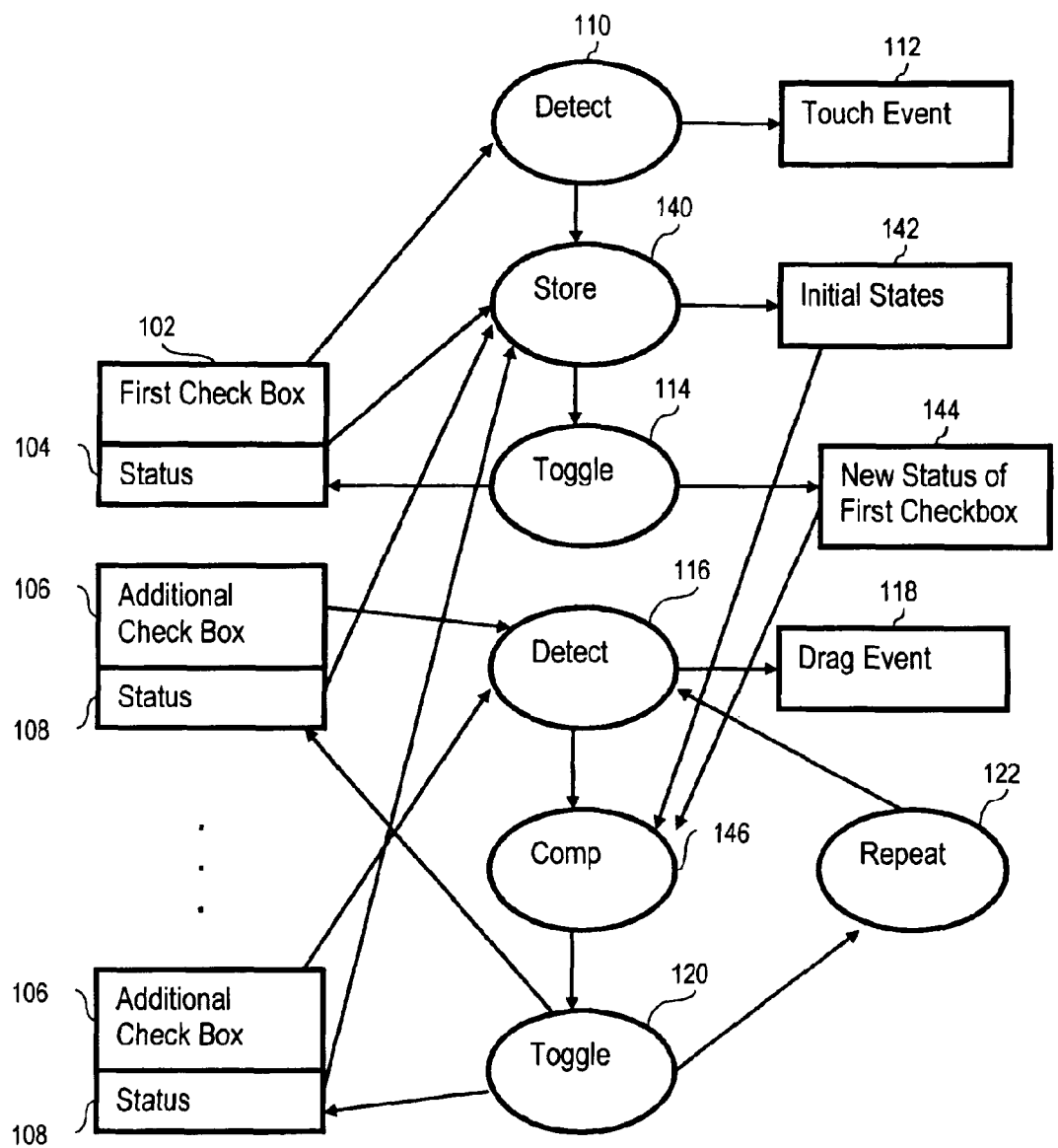
FIG. 1 is a control flow diagram illustrating typical exemplary embodiments of the present invention.

The present invention is described to a large extent in this specification in terms of methods for ad hoc checkbox selection in graphical user interfaces. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITION

"GUI" Means Graphical User Interface.

"Pointer device" means any device coupled to a computer and having the capabilities of indicating pointer device status and moving a pointer displayed on a GUI on the computer. Examples of pointer devices useful with various embodiments of the invention include mice, fingers pressed upon touch sensitive screens, and styli pressed on touch sensitive pads. Other pointer devices will occur to those of skill in the art, and the use of all such pointer devices is well within the scope of the present invention. Pointer device statuses include a status of 'active.' One of the events that will toggle a checkbox occurs, for example, when a pointer device status is changed to 'active' while the pointer is on the checkbox. In the case of mice, 'active' status means 'mouse down.' Pointers moveable on GUIs, in the case of mice, include mouse pointers. In the case of a stylus used with a pressure sensitive pad, 'active' typically means that the stylus is pressed upon the pad. In this specification, because mice and mouseclicks are so common as pointer devices in GUIs, the phrases "first clicked" and "first affected" are considered synonymous.

"Drag" means moving a pointer on a GUI, by use of a pointing device, while the pointing device status is 'active.' In the case of mice, 'drag' means moving the mouse pointer with a mouse button held down, that is, while the mouse status is 'mouse down.' In the case of a stylus used with a pressure sensitive pad, 'drag' often means moving a pointer by pressing the stylus on the pad and moving the stylus while maintaining the pressure of the stylus on the pad.

"Stateful toggle" means a toggle of the status of a checkbox that is dependent upon a checkbox state. Generally in embodiments of the present invention, a "stateful toggle" is a toggle of the status of a checkbox if an initial status of the checkbox is not the same as the new status of a first clicked checkbox. In typical embodiments of the present invention, a "stateful toggle" is a toggle of a checkbox status effected through a select and drag operation of a pointer device.

More specifically, in many embodiments of the present invention, particularly those using a mouse as a pointer device, a "stateful toggle" is a toggle dependent upon the new status of a first checkbox affected in a click and drag operation of a mouse: a toggle occurs if the initial status of a dragged-upon checkbox is different from the new status of a first clicked checkbox. That is, stateful toggles for checkboxes whose initial status is the same as the new status of a first affected checkbox result in no change in status for such checkboxes. In other words, for dragged-upon checkboxes already having the new status of a first affected checkbox, in typical embodiments of the present invention, a stateful toggle has no effect on the status of such dragged-upon checkboxes. In still other words, a stateful toggle is a toggle whose effect depends upon the status of a checkbox, in typical embodiments, a first affected checkbox.

"Persistent stateful toggle" refers to the fact that in typical embodiments of the present invention, some checkbox states 'persist.' Upon experiencing a drag event of a pointer, some checkboxes do not toggle their states. That is, as readers will see from the detailed discussion below, in typical embodiments of the present invention, checkboxes whose initial states are the same as the new state of a first affected checkbox do not change states upon experiencing drag events: Hence the use of the generally descriptive, but not limiting, term "persistent" in the title of this specification.

DETAILED DESCRIPTION

Embodiments of the present invention provide efficient selection and deselection of ad hoc data elements represented by checkboxes on a GUI form using a single click and drag operation. Embodiments of the present invention generally preserve the ability to select or deselect individual items in a data set by reference to the state of a preceding selection. Embodiments of this invention typically solve limitations of prior art, especially with respect to the prior art requirement for multiple touch events from a pointer device, such as mouseclicks from a mouse, by utilizing stateful preservation of the initial status of checkboxes in a set and of the new status of a first affected checkbox and affecting the state of other checkbox items via pointer movement in dependence upon those recorded statuses, that is, pointer movement as such rather than additional touch events. More specifically, embodiments of this invention generally address limitations of prior art by utilizing stateful preservation of the result of a single mouseclick along with the initial states of checkboxes in a set and communication of those states to other checkboxes via pointer movement.

Because of its ubiquitous use as a pointer device, this specification often discusses examples in terms of mice and mouseclicks. No limitation is intended of pointer devices to mice or touch events to mouseclicks. As mentioned earlier, many implementations of pointer devices other than mice are well within the scope of this invention.

Consider the example of a user whose interface relies on a primary mouse button setup. When a user clicks on an initial checkbox item in a set of checkboxes, the "first affected checkbox" or the "first clicked checkbox," all of the statuses or states of the checkboxes in the set are recorded. The statuses so recorded are referred to in this specification as "initial statuses" or "initials states." When a user clicks on a first affected checkbox, that checkbox is selected or deselected depending on the previous state of the first affected checkbox, resulting in a new state of the first affected checkbox. This kind of status change, simply from an initial state to another state, is referred to as a "toggle."

Unlike prior art checkbox sets, however, when the user drags outside of the first affected checkbox in an embodiment of the present invention, the first affected checkbox typically retains its new state. The user then drags the mouse pointer over additional checkboxes in the set. Checkboxes selected by dragging the mouse pointer have their states toggled if their initial states at the time of the initial click on the first clicked checkbox are different from the new state of the first clicked checkbox. Those items selected by dragging the mouse pointer whose states are already the same as the new state of the initial checkbox are unaffected. On subsequent pointer drags over a checkbox, the checkbox's status is toggled only if its initial state was the same as the new state of the first affected checkbox.

The first affected checkbox typically is included in this method. That is, the initial state of the first affected checkbox is recorded upon detecting the first pointer event, the first mouseclick, for example. Then the new state of the first affected checkbox is recorded, and on subsequent drag operations in the first affected checkbox, its status is toggled. In typical embodiments, the status of the first affected checkbox is toggled upon subsequent drags in the first affected checkbox because the initial status of the first affected checkbox is not the same as the new status of the first affected checkbox. That the initial status of the first affected checkbox is not the same as the new status of the first affected checkbox is clear because the new state of the first affected checkbox in typical embodiments is recorded after the status of the first affected checkbox is toggled, which in turn occurs after the initial status of the first affected checkbox is recorded. The initial status of the first affected checkbox therefore typically is not the same as the new status of the first affected checkbox, making the first affected checkbox a checkbox whose status is toggled by subsequent drag events in embodiments of the present invention.

If the user wished to omit items from selection by dragging of the mouse pointer, in typical operation of most embodiments of the present invention, the user simply drags the mouse past or outside the checkboxes for the items to be omitted from selection by the dragging of the mouse pointer. In a checkbox list arranged vertically, the user would drag the mouse pointer past the items by moving the pointer to the left or right and then up or down, so as to bypass checkboxes not to be selected. Of course the reader realizes by now that checkboxes whose initial statuses are the same as the new state of the first affected checkbox are unaffected regardless whether the mouse pointer drags over them or not, so this purpose of not selecting checkboxes by missing them with the dragged mouse pointer is in substance directed to checkboxes having initial statuses that are different from the new status of the first affected checkbox.

A release of the primary mouse button, in typical operation of many embodiments of the present invention, discontinues the click-and-drag operation. A click of the primary mouse button on another checkbox in the set reinitiates the process, thus allowing for continued stateful toggling of additional checkboxes. The invention thus reduces the number of operations required to make ad hoc selections from a checkbox list to a theoretical minimum.

Turning now to FIG. 1, a first example embodiment of the present invention is seen illustrated as a method for stateful toggling of checkbox status applied to a set of checkboxes (102, 106). The example embodiment of FIG. 1 includes detecting (110) a touch event on a first checkbox (102), storing (140) the initial states of all checkboxes in the set (142), and toggling (114) the status (104) of the checkbox to a new status (144). The example embodiment of FIG. 1 includes repeatedly (122), for a multiplicity of repetitions, detecting (116) a drag event (118) for a checkbox (106) onto which a user drags a pointer, where the user typically drags the pointer onto at least one checkbox, comparing (146) the initial status (142) of the checkbox onto which a user drags the pointer and the new status of the first checkbox (144), and, if the initial status of a checkbox (142) for which a drag event is detected is the same as the new status of the first checkbox (144), toggling (120) the status (104, 108) of the checkbox for which a drag event is detected.

Except for the fact that it is the first affected checkbox (102), that is, the checkbox upon which an initiating touch event is detected, there is no difference between the first checkbox (102) and the other checkboxes (106) in typical embodiments of the present invention. The first checkbox (102) is numbered differently from the other checkboxes (106) in FIG. 1 only for convenient reference to the fact that it happens to be the checkbox that experiences the initiating touch event. Any checkbox in the set is eligible to be the first checkbox, selected arbitrarily by an initiating touch event on any checkbox. In this sense, "initiating touch event" means the touch event that begins operation of the method in a particular embodiment, such as, for example, a user's moving a mouse pointer onto a checkbox, any checkbox in the set, and pressing a mouse button. That checkbox, regardless of which one it is within the set, is referred to in this specification as 'the first checkbox' or 'the first affected checkbox.'

With respect to drag events in particular, the operation of all checkboxes is typically the same. A drag event comprises a user's making a pointer device active, as, for example, in holding down a mouse button, and moving the pointer in the active state, as, for example, in holding down the mouse button and dragging the mouse pointer. Holding down the mouse button and dragging the mouse pointer from and to the first affected checkbox (102) typically has the same effect as holding down the mouse button and dragging the mouse pointer from the first checkbox to and over any other checkbox (106).

Typical embodiments of the invention are implemented as software programs installed and operating on computers comprising computer processors coupled to computer memory. Embodiments typically include computer displays which in turn further comprise graphical user interfaces or "GUIs." Typical exemplary embodiments are implemented on or within GUIs, where the GUIs are operated by a user using a pointing device, the pointing device having a capability of indicating a touch on a checkbox, the pointing device having associated with it through the GUI a pointer displayed upon the GUI and responsive to physical motion of the pointing device. In this sense, in typical example embodiments, a "pointer" is a graphical analog of a pointer device, the pointer being displayed on a display screen with a GUI display object, such as a GUI window or dialog box, the pointer moving upon the display in dependence upon a user's physical movement of a corresponding pointer device. In the example of a mouse, the mouse pointer moves on a display screen as a user moves the mouse on a mouse pad.

In typical example embodiments of the present invention, a GUI has displayed upon it a set of checkboxes comprising a multiplicity of checkboxes, wherein each checkbox has a status comprising an indication whether a checkbox is selected. That is, checkboxes typically have at least the two statuses 'selected' and 'not selected.' Checkboxes having the status 'not selected' are often referred to as 'deselected.'

Figure 2A:
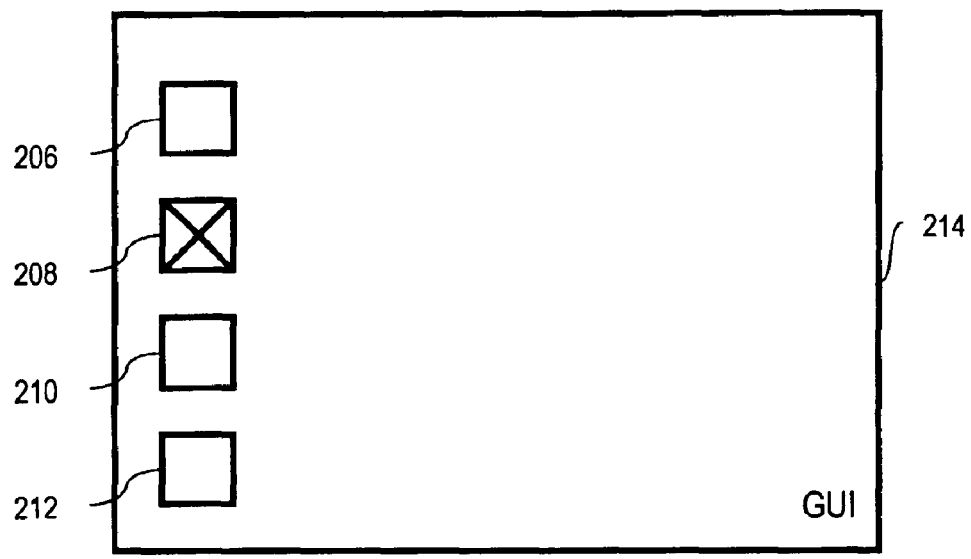
FIG. 2a illustrates initial statuses of checkboxes in a GUI prior to a click and drag event.
Figure 2B:
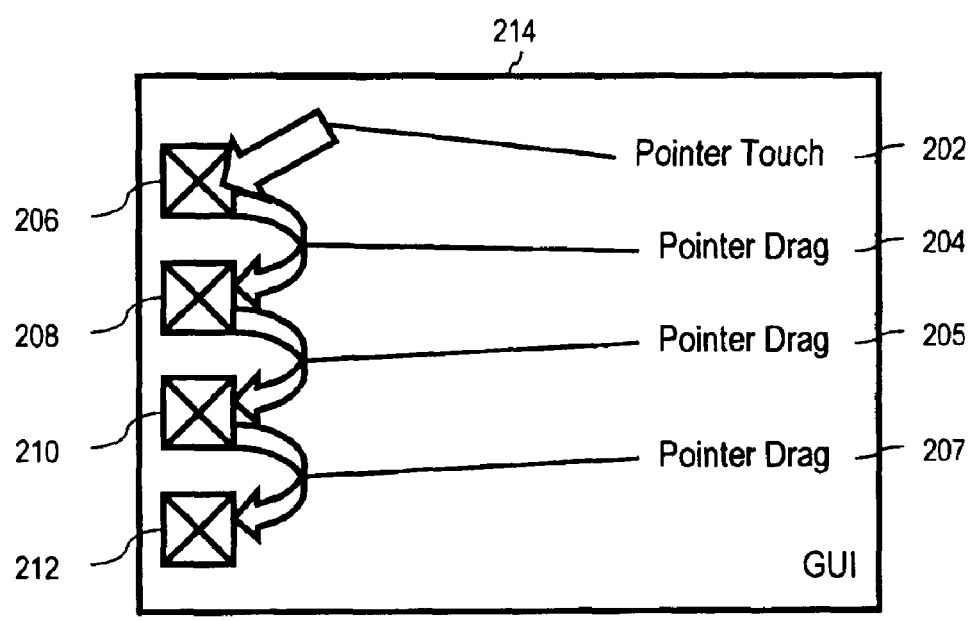
FIG. 2b is a diagram of a click and drag event in a graphical user interface illustrating operation of typical exemplary embodiments of the present invention.
Figure 2C:
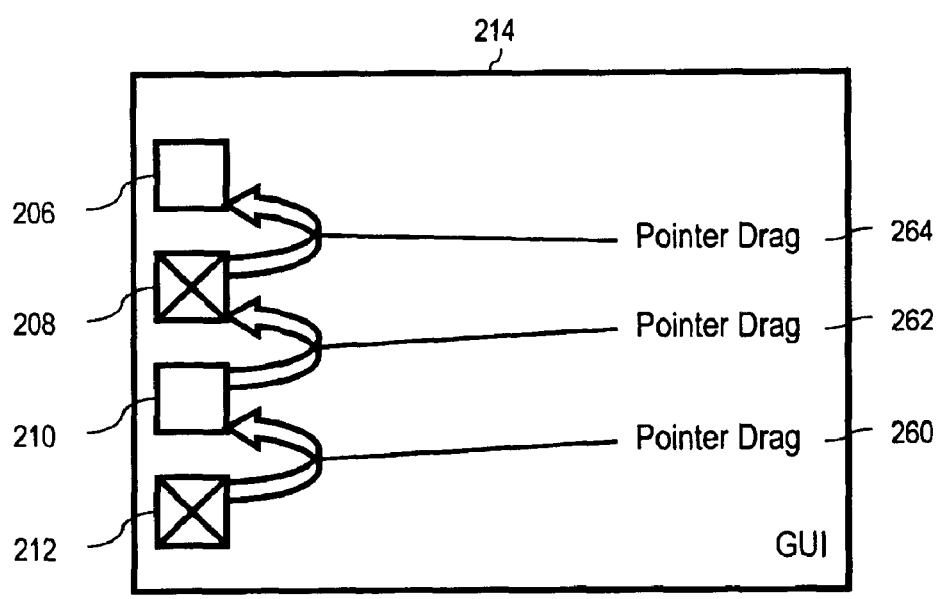
FIG. 2c is a diagram of a continuation from FIG. 2b of the click and drag event in a graphical user interface illustrating operation of typical exemplary embodiments of the present invention.

FIGS. 2a, 2b, and 2c illustrate an example of operation of a further exemplary embodiment. The statuses of the checkboxes in the illustrated embodiment are shown with 'Xs.' Selected checkboxes are illustrated with Xs, as those at reference 208 in FIG. 2a. Deselected checkboxes are illustrated without Xs, as the checkbox at references (206), (210), and (212) in FIG. 2a. FIG. 2a illustrates the initial statuses of checkboxes in a GUI prior to a click and drag event. FIGS. 2b and 2c illustrate the results of a touch event followed by a drag on the statuses of the checkboxes whose initial statuses are shown in FIG. 2a.

The checkboxes in the example embodiment of FIG. 2b began the illustrative process deselected, as shown in FIG. 2a, except for checkbox (208) whose initial status is 'selected.' In the process illustrated in FIG. 2b, a pointer touch event (202), such as a mouse down event, has been detected on first checkbox (206), the initial statuses of all checkboxes in the set has been detected and stored, and the status of first checkbox (206) has been toggled to a new status, from 'deselected' to 'selected,' as indicated by the 'X' in first checkbox (206). Thus in this example, the new status of the first affected checkbox is 'selected.'

Further in the process illustrated in FIG. 2a, a pointer drag event (204) in the form of a mouse drag from checkbox (206) to checkbox (208) has been detected and the initial status of checkbox (208) has been compared with the new status of the first checkbox, and the status of checkbox (208) has been statefully toggled. Which is to say that the status of checkbox (208) remains unchanged because the comparison showed that the initial status of checkbox (208) is the same as the new status of the first checkbox, 'selected.'

Still further in the process illustrated in FIG. 2a, a further pointer drag event (205) in the exemplary form of a mouse drag from checkbox (208) to checkbox (210) has been detected and the status of checkbox (210) has been statefully toggled from 'deselected' to 'selected,' as indicated by the 'X' in checkbox (210). In this case, the stateful toggle comprised a state change because the initial state of checkbox (210) was 'deselected' and the new state of the first checkbox (206) is 'selected.' Similarly, a further pointer drag event (207), an exemplary mouse drag from checkbox (210) to checkbox (212), toggles the status of checkbox (210) from 'deselected' to 'selected,' as indicated by the 'X' in checkbox (210), because the initial state of checkbox (212) was 'deselected' and the new state of the first checkbox (206) is 'selected.'

The status toggles for checkboxes (208), (210) and (212) are said to be 'stateful toggles' because each status change, or lack of status change, depends on the state of a checkbox, that is, upon the new state of the first checkbox (206). Because checkbox (208) had the initial status 'selected,' upon detecting the drag event for that checkbox and comparing its initial state with the new state of the first checkbox, then the stateful toggle has no effect on the status of that checkbox (208). In embodiments of this kind, utilizing a mouse as a pointer device, the stateful toggle only changes checkbox statuses for dragged upon checkboxes (210, 212) whose initial statuses are different from the new status of the first affected checkbox (206).

FIG. 2c illustrates a continuation of the same touch and drag begun in FIG. 2b and shows even further the sense in which toggles are stateful toggles in embodiments of the present invention. In FIG. 2c, a further pointer drag event (260) in the exemplary form of a mouse drag from checkbox (212) to checkbox (210) has been detected and the status of checkbox (210) has been statefully toggled from 'selected' to 'deselected,' as indicated by the 'X' in checkbox (210). In this case, the stateful toggle comprises a state change because the initial state of checkbox (210) was 'deselected' and the new state of the first checkbox (206) is 'selected.' A further pointer drag event (262), an exemplary mouse drag from checkbox (212) to checkbox (208) statefully toggles the status of checkbox (208), once again with no effect because a comparison shows that the initial status of checkbox (208) is the same as the new status of the first checkbox (206), 'selected.'

FIG. 2c also illustrates the similar nature of the first checkbox with respect to other checkboxes for drag events. A further pointer drag event (264) is detected from checkbox (208) to checkbox (206), resulting in a comparison of the initial state of checkbox (206) with the new state of the first checkbox, which also happens to be checkbox (206). The new state of the first checkbox (206), as described above, is 'selected.' The initial state of checkbox (206) was 'deselected.' Because these two statuses are different, the drag event on checkbox (206) results in a stateful toggle that implements a status change from 'selected' to 'deselected.' This toggle in the status of checkbox (206) has no effect on the new status of the first checkbox. The new status of the first checkbox is set at the time of the initiating touch event and remains the same throughout the entire touch and drag sequence, until the pointer goes inactive as, for example, when a mouse button is released, regardless how many times the first checkbox, or any other checkbox, is toggled by repeated drag events.

Figure 3A:
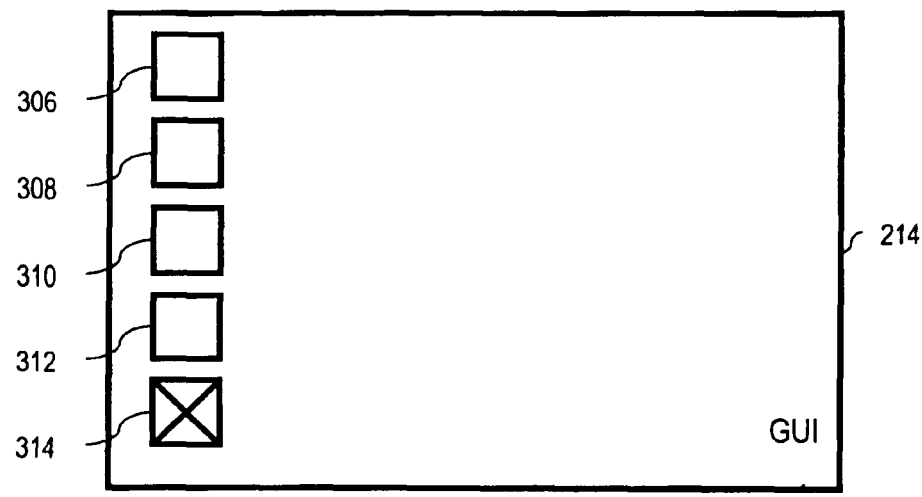
FIG. 3a illustrates initial statuses of checkboxes in a GUI prior to a click and drag event.
Figure 3B:
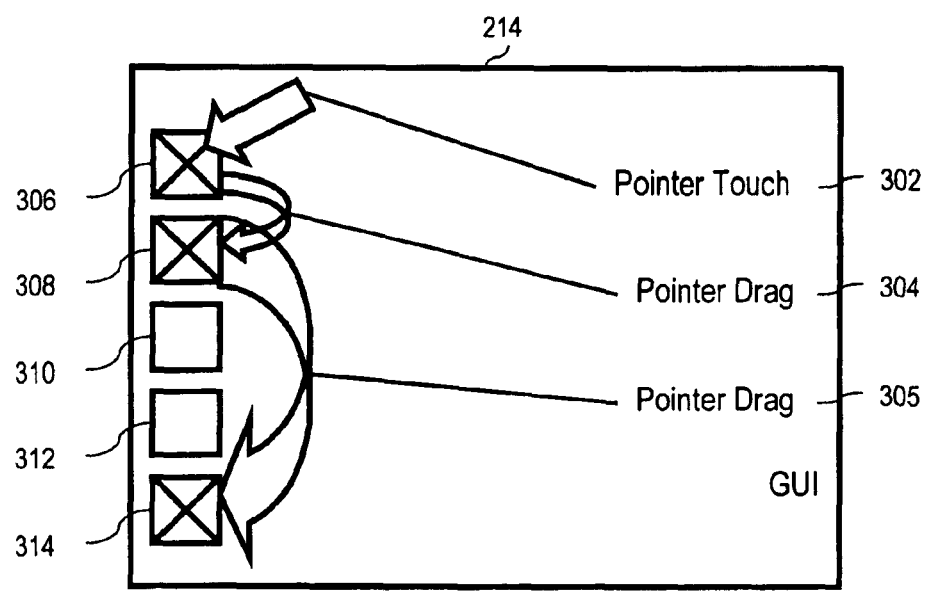
FIG. 3b is a further diagram of a click and drag event in a graphical user interface illustrating operation of typical exemplary embodiments of the present invention.

A still further example embodiment of the invention is illustrated in FIGS. 3a and 3b. Like the process illustrated in FIGS. 2b and 2c, the example process illustrated in FIG. 3b includes repeated drag events (304, 305). Like the initial statuses illustrated in FIG. 2a, the initial statuses illustrated in FIG. 3a show the initial statuses of checkboxes (306–314) prior to the execution of the click and drag process illustrated by FIG. 3b. In the example of FIG. 3a, however, for at least a portion of the repetitions, one or more further checkboxes (310, 312) are positioned upon the display screen in the GUI (214) between two of the additional checkboxes (308, 312), wherein a path (304) along which the pointer drags between the two additional checkboxes lies outside the further checkboxes, whereby the statuses of the further checkboxes remain unaffected.

More specifically, the checkboxes in the example embodiment of FIG. 3a began the illustrative process deselected, except for the checkbox (314), which, as shown in FIG. 3a, began the illustrative process selected. In the process illustrated in FIG. 3b, a pointer touch event (302) in the exemplary form of a mouse down event has been detected on first checkbox (306), the statuses of all checkboxes in the set has been recorded, and the status of first checkbox (306) has been toggled to a new status, from 'deselected' to 'selected,' as indicated by the 'X' in first checkbox (306).

Further in the exemplary process illustrated in FIG. 3b, a pointer drag event (304) in the exemplary form of a mouse drag from first checkbox (306) to checkbox (308), has been detected and, because its initial status was different from the new status of the first checkbox, the status of checkbox (308) has been statefully toggled from 'deselected' to 'selected,' as indicated by the 'X' in checkbox (308). Still further in the process illustrated in FIG. 3b, a further pointer drag event (305), such as, for example, a mouse drag from checkbox (308) to checkbox (314), has been detected, and, the status of checkbox (314) has been statefully toggled to 'selected,' as indicated by the 'X' in checkbox (314). Because the toggle of checkbox (314) is a stateful toggle, the new status of the first checkbox (306) is 'selected,' and the initial status of checkbox (314) is 'selected,' the stateful toggle therefore has no effect on the status of checkbox (314), leaving the status of checkbox (314) 'selected.'

The examples of FIGS. 2a, 2b, 2c, 3a, and 3b also illustrate the repetitive quality of typical embodiments of the present invention in that additional checkbox statuses are statefully toggled as a pointer is dragged repeatedly from checkbox to checkbox. FIG. 3b also illustrates that statuses of checkboxes (310, 312) are unaffected if no pointer event is detected for them. That is, neither a touch event nor a drag event is detected for checkboxes (310) and (312) in the example embodiment of FIG. 3b, and the status of checkboxes (310) and (312) therefore remains as it was at the beginning of the illustrative process, 'deselected.'

In the example of FIG. 3b, no drag event was detected for checkboxes (310) and (312) because in dragging the pointer from checkbox (308) to checkbox (314), the pointer was dragged around checkboxes (310) and (312) without touching them or passing over them. FIGS. 3b illustrates an important advantage of the present invention in that checkbox statuses are toggled in a completely ad hoc fashion just as fast as a user can think and move a pointer across a GUI display, statefully toggling some checkboxes by passing a pointer over them, leaving others unaffected by moving the pointer around them without passing over them.

In many embodiments of the present invention, detecting a touch event comprises changing a pointer device status to 'active' while a pointer for the device is positioned on the checkbox. Pointer device statuses typically include a status of 'active,' One of the events that often toggles a checkbox occurs, for example, when a pointer device status is changed to 'active' while a pointer is on the checkbox. Pointer devices include, for example, a mouse, a stylus pressed upon* touch sensitive pad, and a finger pressed upon a touch sensitive screen In the case of mice, 'active' status means 'mouse button down.' In the case of a stylus used with a pressure sensitive pad, 'active' often means that the stylus is pressed upon the pad Even more specifically, many embodiments of the invention operate as illustrated in the following pseudocode:

//import the Java classes necessary to implement the ad hoc checkbox set
  import java.awt.*;
  import java.awt.event*;
  import javax.swing.*;
  import java.awt.event.MouseAdapter,
  import java.awt.event.MouseMotionAdapter;
  import java.awt.event.MouseEvent;
//begin CheckBoxDemo class—main functionality embedded in this top-level class public class CheckBoxDemo extends JPanel {
JCheckBox oneBox;
JCheckBox twoBox;
JCheckBox threeBox;
JCheckBox fourBox;
public CheckBoxDemo( ) {
  //Create and name the checkboxes
  oneBox=new JCheckBox("one");
  twoBox=new JCheckBox("two");
  threeBox=new JCheckBox("three");
  fourBox=new JCheckBox("four");
    // Set the intial states of the checkboxes
  oneBox.setSelected(false);
  twoBox.setSelected(true);
  threeBox.setSelected(false);
  fourBox.setSelected(false);

/** Register a listener/adapter object for each of the checkboxes* These listener/adapters wait for mouse events such as mouse presses, drags, and enters. We use adapters so that we don't have to specify all of the methods normally required of mouse listeners*/
CheckBoxListener myListener=new CheckBoxListener ();
oneBox.addMouseInputAdapter(myListener);
twoBox.addMouseInputAdapter(myListener);
threeBox.addMouseInputAdapter(myListener);
fourBox.addMouseInputAdapter(myListener);
// Put the checkboxes in a column within the main panel so they can be viewed in a user interface
JPanel checkPanel=new JPanel( );
checkPanel.setLayout(new GridLayout(0, 1));
checkPanel.add(oneBox);
checkPanel.add(twoBox);
checkPanel.add(threeBox);
checkPanel.add(fourBox);
  //Set layout and borders for the panel
setLayout(new BorderLayout( ));
add(checkPanel, BorderLayout.WEST);
setBorder(BorderFactory.createEmptyBorde(20,20,20, 20);
}//end public CheckBoxDemo( )
/** Create a CheckBoxListener class as a sub-class of the CheckBoxDemo class.
The CheckBoxListener class listens for certain mouse events that occur on the checkboxes. This class extends and modifies the MouseInputAdapter class to implement the selection and toggle functionality*/
class CheckBoxListener extends MouseInputAdapter {
  //Create a method that toggles selected states of checkboxes and holds the value of a first checkbox after it is toggled.
  public void toggleBox( ) {
    boolean sourceState=e.getSelected( );
    if(source.getSelected(true)) {
    source.setSelected(false);
    sourceState=e.getSelected( );
    break;
    }//end if(source.getSelected(true))
    else if(souice.getSelected(false)) {
    source.setSelected(true);
    sourceState=e.getSelected( );
    }//end else if(source.getSelected(false))
  }//end public void toggleBox( )
// Get and store original values for all checkboxes, call method to toggle state of first checkbox
  public void origState( ) {
    boolean firstbox=e.getSelected( );
    boolean oneorig=onebox.getSelected( );
    boolean twoorig=twobox.getSelected( );
    boolean threeorig=threebox.getSelected( );
    boolean fourorig=fouibox.getSelected( );
    CheckBoxListenertoggleBox( );
    }//end public void origState( )
/* Create a method that checks the source checkbox of a mouse drag or mouse enter, comparing the original state of that checkbox to the new value of the first checkbox after it has been toggled with an initial mousepress*/

```java
public void dragCheck( ) {
    if (dragsource=oneBox) {
        if(firstbox!=oneorig) {
            CheckboxListener.togglcBox( );
        }
        else if (firstbox=oneorig) {
            break;
        }
    }
    else if (dragsource=twoBox) {
        if(firstbox!=twoorig) {
            CheckboxListener.toggleBox( );
        }
        else if (firstbox=twoorig) {
            break;
        }
    }
    else if (dragsource=threebox) {
        if(firstbox!=threeorig) {
            CheckboxListener.toggleBox( );
        }
        else if (firstbox=threeorig) {
            break;
        }
    }
    else if (dragsource=fourbox) {
        if(firstbox!=fourorig) {
            CheckboxListener.toggleBox( );
        }
        else if (firstbox=fourorig) {
            break;
        }
    }
}//end public void dragCheck( )
    // Listen for an initial mouse press event on a checkbox.
Method only listens for checkbox mouse press
    public void MousePressed(MouseEvent e) {
    /** Create a source object for the mouseevent Capture
the source and test to find which checkbox originated the
event.*/
        Object source=e.getSource( );
        CheckBoxListener.origState( );
    }//end public void MousePressed(MouseEvent e)
    // Listen for MouseDrag event Create a source for that
event
    public void MouseDragged(MouseEvent f) {
        Object source=f.getSource( );
    }//end public void MouseDragged(MouseEvent f)
    // Listen for a MouseEnter event. Create a source for that
event.
    public void MouseEnter(MouseEvent g) {
        Object source=g.getSource( );
    }//end public void MouseEnter(MouseEvent g)
    /** Create a method that compares MouseDrag and
MouseEnter events to settle on a source for events. */
    public void DragEnter( ) {
        if(MouseDragged(MouseEvent f)) && (MouseEnter
            (MouseEvent g))
        {
            Object dragsource=f.getComponent( );
            Object entersource=g.getComponent( );
            if(dragsource=entersource) {
                source=dragsource;
                CheckBoxListener.dragCheck( );
            }//end if(dragsource=entersource)
        }//end if(MouseDragged(MouseEvent f)) &&
            (MouseEnter(MouseEvent g))
    }//end public void DragEnter( )
}//end class CheckBoxListener extends MouseInput-
Adapter
    // the main method for the class, creates a frame and
makes its contents visible public static void main(String s [])
{
    JFrame frame=new JFrame("CheckBoxDemo");
    frame.addWindowListener(new WindowAdapter( ) {
        public void windowClosing(WindowEvent e) {
            System.exit(0);
        }
    });
    frame.setContentPane(new CheckBoxDemo( ));
    frame.pack( );
    frame.setVisible(tnie);
    }//end public static void main(String s[])
}// end CheckBoxDemo class
    //import the Java classes necessary to implement the ad
hoc checkbox set.
    import java,awt.*;
    import java.awt.event *;
    import javax.swing.*;
    import java.awt event.MouseAdapter,
    import java,awt.event.MouseMotionAdapter;
    import java.awt.event.MouseEvent;
    // begin CheckBoxDemo class=main functionality
embedded in this top-level class public class CheckBox-
Demo extends JPanel {
JCheckBox oneBox;
JCheckBox twoBox;
JCheckBox threeBox;
JCheckBox fourBox;
public CheckBoxDemo( ) {
    // Create and name the checkboxes
    oneBox=new JCheckBox("one");
    twoBox=new JCheckBox("two");
    threeBox=new JCheckBox("three");
    fourBox=new JCheckBox("four");
    // Set the intial states of the checkboxes
    oneBox.setSelected(false);
    twoBox.setSelected(true);
    threeBox.sctSelccted(false);
    fourBox.setSelected(false);
    /** Register a listener/adapter object for each of the
        checkboxes. These listener/adapters wait for mouse
        events such as mouse presses, drags, and enters. We use
        adapters so that we don't have to specify all of the
        methods normally required of mouse listeners*/
    CheckBoxListener myListener=new CheckBoxListener
        ();
    oneBox.addMouseInputAdapter(myListener);
    twoBox.addMouseInputAdapter(myListener);
    threeBox,addMouseInputAdapter(myListener);
    fourBox.addMouseInputAdapter(myListener);
    // Put the checkboxes in a column within the main panel
        so they can be viewed in a user interface
    JPanel checkPanel=new JPanel( );
    checkPanel.setLayout(new GridLayout(0, 1));
    checkPanel.add(oneBox);
    checkPanel.add(twoBox);
```

```
checkPanel.add(threeBox);
checkPanel.add(fourBox);
    //Set layout and borders for the panel
setLayout(new BorderLayout( ));
add(checkPanel, BorderLayout.WEST);
setBorder(BorderFactory.createEmptyBorder(20,20,20,
    20,)
}//end public CheckBoxDemo( )
/** Create a CheckBoxListener class as a sub-class of the
    CheckBoxDemo class.
The CheckBoxListener class listens for certain mouse
events that occur on the checkboxes. This class extends and
modifies the MouseInputAdapter class to implement the
selection and toggle functionality*/
class CheckBoxListener extends MouseInputAdapter {
    //Create a method that toggles selected states of check-
boxes and holds the value of a first checkbox after it is
toggled
    public void toggleBox( ) {
        boolean sourceState=e.getSelected( );
        if(source.getSelected(true)) {
        source.setSelected(false);
        sourceState=e.getSelected( );
        break;
        }//end if(source.getSelected(true))
        else if(source.getSelected(false)) {
        source.setSelected(true);
        sourceState=e.getSelected( );
        }//end else if(source.getSelected(false))
    }//end public void toggleBox( )
    // Get and store original values for all checkboxes, call
method to toggle state of first checkbox
    public void origState( ) {
        boolean firstbox=e.getSelected( );
        boolean oneorig=onebox.getSelected();
        boolean twoorig=twobox.getSelected( );
        boolean threeorig=threebox.getSelected( );
        boolean fourorig=fourbox.getSelected();
        CheckBoxListener.toggleBox( );
        }//end public void origState( )
    /* Create a method that checks the source checkbox of a
mouse drag or mouse enter, comparing the original state of
that checkbox to the new value of the first checkbox after it
has been toggled with an initial mousepress*/
    public void dragCheck( ) {
        if (dragsource=oneBox) {
            if(firstbox!=oneorig) {
            CheckboxListener.toggleBox( );
            }
            else if (firstbox=oneorig) {
            break;
            }
        }
        else if (dragsource=twoBox) {
            if(firstbox!=twoorig) {
            CheckboxListener.toggleBox( );
            }
            else if (firstbox=twoorig) {
            break;
            }
        }
        else if (dragsource=threebox) {
            if(firstbox!=threeorig) {
            CheckboxListener.toggleBox( );
            }
            else if (firstbox=threeorig) {
            break;
            }
        }
        else if (dragsource=fourbox) {
            if(firstbox!=fourorig) {
            CheckboxListener.toggleBox( );
            }
            else if (firstbox=fourorig) {
            break;
            }
        }
    }//end public void dragCheck( )
    // Listen for an initial mouse press event on a checkbox.
Method only listens for checkbox mouse press
    public void MousePressed(MouseEvent e) {
    //** Create a source object for the mouseevent. Capture
the source and test to find which checkbox originated the
event*/
        Object source=e.getSource( );
        CheckBoxListener.origState( );
        }//end public void MousePressed(MouseEvent e)
    // Listen for MouseDrag event. Create a source for that
event,
        public void MouseDragged(MouseEvent f) {
            Object source=f.getSource( );
        }//end public void MouseDragged(MouseEvent f)
    // Listen for a MouseEnter event. Create a source for that
event
        public void MouseEnter(MouseEvent g) {
            Object source=g.getSource( );
        }//end public void MouseEnter(MouseEvent g)
    /** Create a method that compares MouseDrag and
        MouseEnter events to settle on a source for events. */
    public void DragEnter( ) {
        if(MouseDragged(MouseEvent f)) && (MouseEnter
            (MouseEvent g))
    }
        Object dragsource=f.getComponent( );
        Object entersource=g.getComponent( );
            if(dragsource=entersource) {
            source=dragsource;
            CheckBoxListener.dragCheck( );
            }//end if(dragsource=entersource)
        }//end if(MouseDragged(MouseEvent f)) &&
            (MouseEnter(MouseEvent g))
    }//end public void DragEnter( )
    }//end class CheckBoxListener extends MouseInput-
Adapter
    // the main method for the class, creates a frame and
makes its contents visible public static void main(String s[])
{
    JFrame frame=new JFrame("CheckBoxDemo");
    frame.addWindowListener(new WindowAdapter( ) {
        public void windowClosing(WindowEvent e) {
            System,exit(0);
        }
    });
    frame.setContentPane(new CheckBoxDemo( ));
    frame.pack( );
    frame.setVisible(true);
        }//end public static void main(String s[])
    }// end CheckBoxDemo class
```

In fact, the pseudocode comprises a fairly complete illustration of an example embodiment, including as it does, for example, import statements for Java classes that implement GUI elements and classes for listening for GUI events. The pseudocode example also provides for extensions of standard interface capabilities by adding capabilities for checkboxes to listen for mouse events, selecting and deselecting checkboxes, and communicating checkbox status to other application elements. Using Java AWT and Swing classes, for example, checkbox statements for extension capabilities create objects in background Actual instantiations are accomplished in the example pseudocode, as in typical Java application, by implementation methods such as those in the public class CheckBoxDemo statements.

The pseudocode includes setting initial values for checkboxes, which are any combination of selected and deselected items within a set of checkboxes. In the example, this function is accomplished via the public CheckBoxDemo statements, along with a oneBox.setSelected(false) statement, a twoBox.setSelected(true) statement, and so on.

The extended capabilities illustrated in the pseudocode include a capability for a first checkbox clicked to gather the statuses of all checkboxes. More specifically, a first click on a first clicked checkbox, detected by checkBoxListener( ), results in a call to getSource( ) which identifies the first clicked checkbox. CheckBoxListener( ) then calls origState() which in turn stores the initial statuses of all the checkboxes in the set, toggles the status of the first checkbox clicked, and stores in the variable FirstBox the new status of the first clicked checkbox.

When a mousedrag event occurs over a checkbox, checkBoxListener( ) calls dragEnter( ). DragEnter( ) identifies the dragged checkbox, then calls the dragcheck( ) method. The dragCheck( ) method then compares the initial status of the dragged checkbox with the new value of the first clicked checkbox in FirstBox. If the values do not match, then dragCheck toggles the status of the dragged checkbox. If they do match, nothing happens.

Even more specifically, the exemplary pseudocode illustrates an implementation of these capabilities: Embodiments according to the pseudocode example create and name checkboxes and place them in a set. Such embodiments also implement capabilities for each checkbox to listen to mouse events such as 'mouse key is pressed down,' 'mouse pointer is dragged,' and so on, and identify a checkbox as a source for such mouse events. Such embodiments also have the capability of checkbox status toggling such that, after an initial mouse press for a pointer over a checkbox, subsequent dragging over checkboxes toggles the status of those checkboxes whose initial status was not the same as the new status of the first clicked checkbox.

In such embodiments, on an initial mouse press, the source checkbox for the mouse press is toggled. On a subsequent mouse drag and entry over a checkbox, the checkbox dragged over has its state toggled if the initial status of the dragged-upon checkbox is not the same as the new status of the first clicked checkbox, that is, a stateful toggle. If a checkbox has already been dragged over but the mouse button has not been released, subsequent drag and entry over the same checkbox in a single user motion continues to toggle checkboxes whose initial status was not the same as the new status of the first clicked checkbox. Releasing the mouse button ends the sequence.

Embodiments of this invention have wide practical applications, including the following additional examples:

Additional alternative example embodiment: An e-commerce application in which a user selects multiple items for an online shopping cart. Prior to this invention, a user would need to provide a single click for each item in a shopping cart list, or select all items in a list. If the user desires to make ad hoc selections, which is likely in an online purchasing context, the user would need to make single clicks for each selection. This invention greatly simplifies the process, thus allowing a single click-and-drag operation to make multiple purchases.

Additional alternative example embodiment: An online search engine in which user selects returned search items by choosing those answers best meeting the original query. This invention would facilitate quick selection of those items, allowing the search engine to narrow the search criteria by profiling the selected documents.

Additional alternative example embodiment: A database application that allows ad hoc selection of multiple items, and subsequent search on the subset of selected items. This invention facilitates quick narrowing from a set of items returned from a database to a smaller subset. Such would be especially useful when selected items are linked in a sequence to a set of related data. For example, a real estate database may return a set of initial addresses. Users could select items on an ad hoc basic, and then be taken to data that characterizes those addresses.

A method that facilitates ad hoc selection of checkbox items using a single click-and-drag operation achieves many goals of contemporary computing. Such a method is consistent with user interface design principles that encourage the minimum number of operations necessary to complete a task. From an ease-of-use perspective, a single click-and-drag approach to checkbox lists has several advantages. For example, it is vastly preferable for users with physical impairments that may make repeated selection of items difficult. These include users who have suffered repetitive motion injuries or whose fine motor skills make clicking on individual checkbox items more difficult. Guidelines from the Human Factors and Ergonomics Society (HFES 200-199X) encourage adoption of interfaces that address keyboard considerations, reduce multiple operations, and identify pointer alternatives, both for users who require assisting devices and those who do not. Even for those users who face no special challenges in pointer operation, this invention greatly reduces the difficulty in selecting multiple items in a checkbox list.

In summary, this invention turns away from the traditional approach toward checkbox lists by providing, among other improvements, an option for users to change checkbox states for multiple checkboxes with a single click and drag operation, thus facilitating ad hoc selection of computerized data. Many embodiments of this invention are platform independent and suitable for compiled and web-based applications on any operating system.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A method for stateful toggling of checkbox status,
the method implemented as a software program installed and operating on a computer comprising a computer processor coupled to computer memory,
the computer comprising also a computer display which itself further comprises a graphical user interface ("GUI"), the method implemented on the GUI, the GUI operated by a user using a pointing device, the pointing device having a capability of indicating a touch on a checkbox, the pointing device having associated with it through the GUI a pointer displayed upon the GUI and responsive to physical motion of the pointing device, the GUI having displayed upon it a set of checkboxes comprising a multiplicity of checkboxes, wherein each checkbox has a status comprising an indication whether a checkbox is selected, the method comprising the steps of:

detecting a touch event on a first checkbox;

storing the initial status of all checkboxes in the set;

toggling the status of the first checkbox to a new status;

repeatedly, for a multiplicity of repetitions, carrying out the steps of:

detecting a drag event for a checkbox onto which a user drags the pointer;

comparing the initial status of the checkbox onto which a user drags the pointer and the new status of the first checkbox; and if the stored initial status of a checkbox for which a drag event is detected is the same as the new status of the first checkbox, toggling the status of the checkbox for which a drag event is detected.

2. The method of claim 1 wherein, for at least a portion of the repetitions, one or more further checkboxes are positioned upon the display screen in the GUI between two of the additional checkboxes, wherein a path along which the pointer drags between the two additional checkboxes lies outside the further checkboxes, whereby the statuses of the further checkboxes remain unaffected.

3. The method of claim 1 wherein detecting a touch event comprises changing a pointer device status to 'active' while a pointer for the device is positioned on the checkbox.

4. The method of claim 1 wherein the pointing device is a mouse.

5. The method of claim 1 wherein the pointing device is a stylus pressed upon a touch sensitive pad.

6. The method of claim 1 wherein the pointing device is a finger pressed upon a touch sensitive screen.

7. The method of claim 1 wherein the first checkbox has a GUI image and toggling the status of the first checkbox includes changing the GUI image of the first checkbox to indicate a change in the status of the first checkbox.

8. A method of stateful toggling of checkbox status, the method implemented as a software program installed and operating on a computer comprising a computer processor coupled to computer memory, the computer comprising also a computer display which itself further comprises a graphical user interface ("GUI"), the method implemented on the GUI, the GUI operated by a user using a mouse, the mouse comprising a mouse button, the mouse having associated with it through the GUI a mouse pointer displayed upon the GUI and responsive to physical motion of the mouse, the GUI having displayed upon it a set of checkboxes comprising a multiplicity of checkboxes, wherein each checkbox has a status comprising an indication whether a checkbox is selected, the method comprising the steps of:

the user positioning the mouse pointer on a first checkbox;

the user depressing the mouse button, wherein results a mouse down event;

detecting the mouse down event on the first checkbox;

storing the initial status of all checkboxes in the set;

toggling the status of the first checkbox to a new status;

the mouse, at the behest of the user, dragging the mouse pointer along a path on the display screen from the first checkbox to a second checkbox;

detecting a mouse drag event on the second checkbox;

comparing the initial status of the second checkbox and the new status of the first checkbox; and if the stored initial status of the second checkbox is the same as the new status of the first checkbox, toggling the status of the second checkbox.

9. The method of claim 8 wherein a third checkbox is positioned upon the display screen in the GUI at a position between the first checkbox and the second checkbox, wherein the path along which the mouse pointer is dragged from the first checkbox to the second checkbox lies entirely outside the third checkbox, whereby the steps of moving the mouse pointer to the second checkbox, detecting the mouse drag event, comparing the initial status of the second checkbox and the new status of the first checkbox, and toggling the status of the second checkbox leave the third checkbox unaffected.

10. A system for stateful toggling of checkbox status, the system implemented as a software program installed and operating on a computer comprising a computer processor coupled to computer memory, the computer comprising also a computer display which itself further comprises a graphical user interface ("GUI"), the system implemented on the GUI, the GUI operated by a user using a pointing device, the pointing device having a capability of indicating a touch on a checkbox, the pointing device having associated with it through the GUI a pointer displayed upon the GUI and responsive to physical motion of the pointing device, the GUI having displayed upon it a set of checkboxes comprising a multiplicity of checkboxes, wherein each checkbox has a status comprising an indication whether a checkbox is selected, the system comprising:

means for detecting a touch event on a first checkbox;

means for storing the initial status of all checkboxes in the set;

means for toggling the status of the first checkbox to a new status;

means for repeatedly, for a multiplicity of repetitions, carrying out the steps of:

means for detecting a drag event for a checkbox onto which a user drags the pointer;

means for comparing the initial status of the checkbox onto which a user drags the pointer and the new status of the first checkbox; and if the stored initial status of a checkbox for which a drag event is detected is the same as the new status of the first checkbox, means for toggling the status of the checkbox for which a drag event is detected.

11. The system of claim 10 wherein, for at least a portion of the repetitions, one or more further checkboxes are positioned upon the display screen in the GUI between two of the additional checkboxes, wherein a path along which the pointer drags between the two additional checkboxes lies outside the further checkboxes, whereby the statuses of the further checkboxes remain unaffected.

12. The system of claim 10 wherein means for detecting a touch event comprises changing a pointer device status to 'active' while a pointer for the device is positioned on the checkbox.

13. The system of claim 10 wherein the pointing device is a mouse.

14. The system of claim 10 wherein the pointing device is a stylus pressed upon a touch sensitive pad.

15. The system of claim 10 wherein the pointing device is a finger pressed upon a touch sensitive screen.

16. The system of claim 10 wherein the first checkbox has a GUI image and means for toggling the status of the first checkbox includes changing the GUI image of the first checkbox to indicate a change in the status of the first checkbox.

17. A system of stateful toggling of checkbox status,
the system implemented as a software program installed and operating on a computer comprising a computer processor coupled to computer memory,
the computer comprising also a computer display which itself further comprises a graphical user interface ("GUI"),
the system implemented on the GUI, the GUI operated by a user using a mouse, the mouse comprising a mouse button, the mouse having associated with it through the GUI a mouse pointer displayed upon the GUI and responsive to physical motion of the mouse,
the GUI having displayed upon it a set of checkboxes comprising a multiplicity of checkboxes, wherein each checkbox has a status comprising an indication whether a checkbox is selected,
the system comprising:
the user positioning the mouse pointer on a first checkbox;
the user depressing the mouse button, wherein results a mouse down event;
means for detecting the mouse down event on the first checkbox;
means for storing the initial status of all checkboxes in the set;
means for toggling the status of the first checkbox to a new status;
the mouse, at the behest of the user, dragging the mouse pointer along a path on the display screen from the first checkbox to a second checkbox;
means for detecting a mouse drag event on the second checkbox;
means for comparing the initial status of the second checkbox and the new status of the first checkbox; and
if the stored initial status of the second checkbox is the same as the new status of the first checkbox, means for toggling the status of the second checkbox.

18. The system of claim 17 wherein a third checkbox is positioned upon the display screen in the GUI at a position between the first checkbox and the second checkbox, wherein the path along which the mouse pointer is dragged from the first checkbox to the second checkbox lies entirely outside the third checkbox, whereby the steps of moving the mouse pointer to the second checkbox, detecting the mouse drag event, comparing the initial status of the second checkbox and the new status of the first checkbox, and toggling the status of the second checkbox leave the third checkbox unaffected.

19. A computer program product for stateful toggling of checkbox status,
the computer program product implemented as a software program installed and operating on a computer comprising a computer processor coupled to computer memory,
the computer comprising also a computer display which itself further comprises a graphical user interface ("GUI"),
the computer program product implemented on the GUI, the GUI operated by a user using a pointing device, the pointing device having a capability of indicating a touch on a checkbox, the pointing device having associated with it through the GUI a pointer displayed upon the GUI and responsive to physical motion of the pointing device,
the GUI having displayed upon it a set of checkboxes comprising a multiplicity of checkboxes, wherein each checkbox has a status comprising an indication whether a checkbox is selected,
the computer program product comprising:
a recording medium;
means, recorded on the recording medium, for detecting a touch event on a first checkbox;
means, recorded on the recording medium, for storing the initial status of all checkboxes in the set;
means, recorded on the recording medium, for toggling the status of the first checkbox to a new status;
means, recorded on the recording medium, for repeatedly, for a multiplicity of repetitions, carrying out the steps of:
means, recorded on the recording medium, for detecting a drag event for a checkbox onto which a user drags the pointer;
means, recorded on the recording medium, for comparing the initial status of the checkbox onto which a user drags the pointer and the new status of the first checkbox; and
if the stored initial status of a checkbox for which a drag event is detected is the same as the new status of the first checkbox, means, recorded on the recording medium, for toggling the status of the checkbox for which a drag event is detected.

20. The computer program product of claim 19 wherein, for at least a portion of the repetitions, one or more further checkboxes are positioned upon the display screen in the GUI between two of the additional checkboxes, wherein a path along which the pointer drags between the two additional checkboxes lies outside the further checkboxes, whereby the statuses of the further checkboxes remain unaffected.

21. The computer program product of claim 19 wherein means, recorded on the recording medium, for detecting a touch event comprises changing a pointer device status to 'active' while a pointer for the device is positioned on the checkbox.

22. The computer program product of claim 19 wherein the pointing device is a mouse.

23. The computer program product of claim 19 wherein the pointing device is a stylus pressed upon a touch sensitive pad.

24. The computer program product of claim 19 wherein the pointing device is a finger pressed upon a touch sensitive screen.

25. The computer program product of claim 19 wherein the first checkbox has a GUI image and means, recorded on the recording medium, for toggling the status of the first checkbox includes changing the GUI image of the first checkbox to indicate a change in the status of the first checkbox.

26. A computer program product of stateful toggling of checkbox status, the computer program product implemented as a software program installed and operating on a computer comprising a computer processor coupled to computer memory, the computer comprising also a computer display which itself further comprises a graphical user interface ("GUI"), the computer program product implemented on the GUI, the GUI operated by a user using a mouse, the mouse comprising a mouse button, the mouse having associated with it through the GUI a mouse pointer displayed upon the GUI and responsive to physical motion of the mouse, the GUI having displayed upon it a set of checkboxes comprising a multiplicity of checkboxes, wherein each checkbox has a status comprising an indication whether a checkbox is selected, the computer program product comprising:

a recording medium;

the user positioning the mouse pointer on a first checkbox;

the user depressing the mouse button, wherein results a mouse down event;

means, recorded on the recording medium, for detecting the mouse down event on the first checkbox;

means, recorded on the recording medium, for storing the initial status of all checkboxes in the set;

means, recorded on the recording medium, for toggling the status of the first checkbox to a new status;

the mouse, at the behest of the user, dragging the mouse pointer along a path on the display screen from the first checkbox to a second checkbox;

means, recorded on the recording medium, for detecting a mouse drag event on the second checkbox;

means, recorded on the recording medium, for comparing the initial status of the second checkbox and the new status of the first checkbox; and if the stored initial status of the second checkbox is the same as the new status of the first checkbox, means, recorded on the recording medium, for toggling the status of the second checkbox.

27. The computer program product of claim 17 wherein a third checkbox is positioned upon the display screen in the GUI at a position between the first checkbox and the second checkbox, wherein the path along which the mouse pointer is dragged from the first checkbox to the second checkbox lies entirely outside the third checkbox, whereby the steps of moving the mouse pointer to the second checkbox, detecting the mouse drag event, comparing the initial status of the second checkbox and the new status of the first checkbox, and toggling the status of the second checkbox leave the third checkbox unaffected.

* * * * *